Oct. 23, 1962     J. G. LEE     3,059,877

HELICOPTER ANTI-TORQUE DEVICE

Filed Aug. 11, 1961

RESULTANT FORCE

INVENTOR
JOHN G. LEE
BY *Leonard F. Weklind*
ATTORNEY

United States Patent Office 3,059,877
Patented Oct. 23, 1962

3,059,877
HELICOPTER ANTI-TORQUE DEVICE
John G. Lee, Farmington, Conn., assignor to United Aircraft Corporation, East Hartford, Conn., a corporation of Delaware
Filed Aug. 11, 1961, Ser. No. 131,023
8 Claims. (Cl. 244—17.19)

This invention relates to helicopters, and more particularly to rotor sustained vehicles having a simple anti-torque mechanism which eliminates the use of a tail rotor.

It is an object of this invention to provide an anti-torque mechanism for a helicopter which utilizes a secondary flow of air to create a circulation about an aft section of the fuselage, which in the presence of the down-wash from the main rotor induces an aerodynamic side force, which opposes the torque reaction from the main rotor.

It is a further object of this invention to utilize the exhaust flow from the power plant which drives the main rotor, and to control this flow, to vary the anti-torque forces produced by the mechanism of this invention.

These and other objects of this invention will become readily apparent from the following detailed description of the drawing in which.

Figure 1:
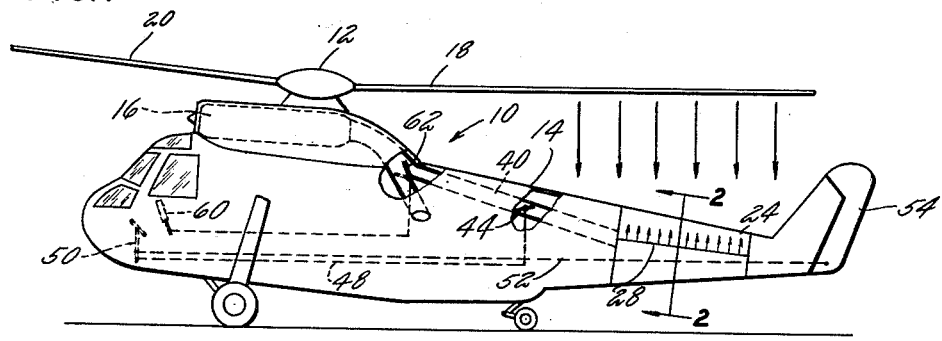
FIG. 1 is a simple illustration of a helicopter with the elements of the anti-torque mechanism and control shown in partial schematic.

Referring to FIG. 1, a helicopter is generally illustrated at 10 as having a main rotor 12 and in elongated fuselage 14. The rotor 12 may be suitably mounted above the fuselage 14 and may be driven by one or more turbine type power plants 16 in a manner well known in the art. It is to be understood that the power plants may be of any type, however, and the illustration herein is not intended to be limited in any manner. The rotor 12 includes a plurality of blades 18 and 20 which are suitably mounted for cyclic and total pitch variations in a manner well known in the art.

The usual controls for the rotor blades have been omitted for convenience in the illustration.

It is well known in the aerodynamic art that providing circulation of air about a body of roughly circular cross-section will produce an aerodynamic force or lift on that body in a direction dependent upon the direction of circulation. See NASA Technical Note D-244 entitled Lift Generation on a Circular Cylinder by Tangential Blowing From Surface Slot, by Vernard Lockwood, and dated May 19, 1960. This phenomena is utilized according to this invention for providing an anti-torque device which will counteract the tendency of the helicopter fuselage to rotate in a direction opposite that of the main rotor.

Figure 2:
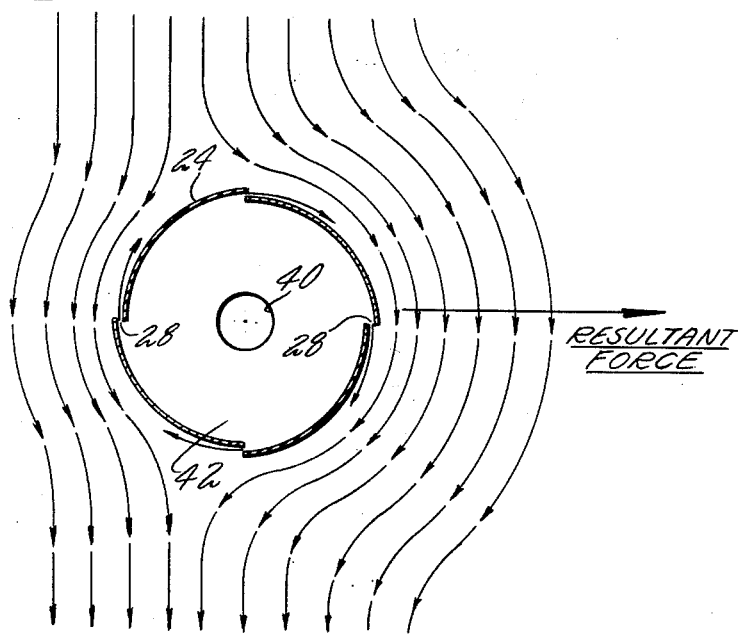
FIG. 2 is a sectional view taken along the line 2—2 of FIG. 1.

In this respect, the fuselage 14 includes an aft section 24 which is located below the disc or rotor path and is exposed to the down-wash from the rotor. This aft section may be circular or of other cross-sectional shape. FIG. 2 illustrates the circular cross-section wherein there is provided one or more ejection slots 28. If air is ejected from slots 28, the flow therefrom will induce a clockwise circulation about the fuselage aft section 24, when viewed from the rear. In the presence of the down-wash from the main rotor (FIG. 2), the flow adjacent to section 24 will be accelerated on the right side, and retarded on the left side. This induces a force to the right as represented by the vector 32 which will counteract the torque acting on the helicopter fuselage.

The exhaust from the engine 16 may be conducted via a duct 40 to the annular chamber 42 formed by the walls of the aft section 24 of the fuselage 14. Fluid under pressure from the chamber 42 flows out through the slots 28.

The duct 40 may include a valve 62 which can control the amount of gas flow in the duct 40, any excess may be bypassed through an aft directed exhaust opening 46 at the rear of the fuselage. The valve 44 may include a connection 48 to a suitable rudder control 50 which can be used to control the vehicle in high speed forward flight. To this end a manual control 60 may also be used to regulate the shutoff valve 62 so that the flow of gases in the duct 40 to the ejector slots 28 can be reduced during the periods when the rudder 54 is effective.

It should also be noted that during hovering, when a large amount of power is being fed to the rotor, not only is the down-wash from the rotor blades effectively greater but the exhaust flow from the power plant is also greater. As a result, at a time when the anti-torque requirements are the greatest, the largest amount of effective anti-torque forces are available from the action of the ejector slots 28.

Figure 3:
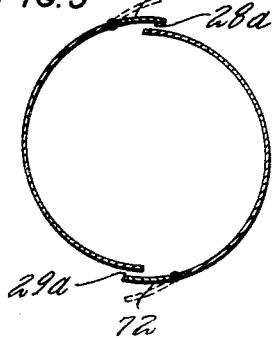
FIG. 3 is a sectional view similar to FIG. 2, showing an alternate arrangement.

FIG. 3 illustrates an alternate arrangement for a helicopter wherein only two slots, 28a and 29a are shown. These slots are controlled by flaps 70, 72 which may be operated together, collectively, or differentially. When they are operated differentially the lateral force due to the jet reaction itself is modified to change the lateral force. When they are operated collectively the amount of circulation around the fuselage is modified.

It will be apparent that as a result of this invention, automatic, semiautomatic, or controllable means is provided for inducing anti-torque forces adjacent the tail section of a helicopter while eliminating the need for tail rotors. The mechanism of this invention is simple, light weight, and effective in a degree commensurate with the requirement for anti-torque control in the various regimes of flight, including yaw control at very low forward speeds.

Although several embodiments of this invention have been illustrated and described herein, it will be apparent that various changes and modifications may be made in the arrangement and construction of the various parts without departure from the scope of this novel concept.

I claim:

1. In a helicopter having an elongated fuselage, a main sustaining rotor mounted for rotation in a plane above said fuselage, said fuselage including a section adjacent the tail end thereof, said section including at least one elongated slot extending fore-and-aft and lying below the rotor and in the path of the down-wash from said rotor, and means for pumping fluid through said slot to cause a circulation of flow around the surface of the fuselage in the vicinity of said down-wash.

2. In a helicopter having an elongated fuselage, a main sustaining rotor mounted for rotation in a plane above said fuselage, said fuselage containing one or more slots extending fore-and-aft and lying below the plane of rotation of said rotor and in the path of the down-wash from said rotor, and means for pumping gas through said slot to cause a circulation of flow around the surface of the fuselage in the vicinity of said down-wash to create an aerodynamic force acting normal to said fuselage.

3. In a helicopter having an elongated fuselage, a main sustaining rotor including blades mounted for rotation in a plane above said fuselage, said fuselage including a section adjacent the tail end thereof, said section including one or more elongated slots extending fore-and-aft and lying below the rotor and in the path of the down-wash from said rotor, means for driving said rotor including a source of gas under pressure, means for conducting gas from said source through said slots to cause a circulation of flow around the surface of the fuselage in the vicinity of said down-wash to create aerodynamic forces on said section to counteract the torque of said rotor and means for controlling the flow of gas through said slots to vary the magnitude of said forces.

4. In a helicopter according to claim 3 including means for cyclically varying the pitch of said blades, means for simultaneously varying the pitch of all of said blades, and means connecting said last-mentioned means and said means for controlling the flow of said gas.

5. In a helicopter according to claim 3, means for selectively and differentially controlling the amount of flow of said gas through the individual slots or through a bypass valve.

6. In a helicopter having an elongated fuselage, a main sustaining rotor mounted for rotation in a plane above said fuselage, an engine carried by said fuselage and driving said rotor in a given direction, said fuselage including top, bottom and side sections adjacent the tail end thereof, one of said side sections including an elongated slot extending fore-and-aft and lying below the plane of rotation of said rotor and substantially streamlined relative to the path of the down-wash from said rotor, and means for pumping gas through said slot to cause a circulation of flow substantially tangentially around said fuselage in the vicinity of said down-wash to create an aerodynamic force acting on said fuselage in a direction similar to that of the blades passing said section.

7. In a helicopter having an elongated fuselage, a main sustaining rotor mounted on a vertical axis for rotation in a plane above said fuselage, a power plant driving said rotor and carried by said fuselage thereby creating a torque on said fuselage about said axis, said fuselage having at least one longitudinally extending slot adjacent the tail end thereof and spaced from said axis, and lying below the plane of rotation of said rotor and in the path of the down-wash from said rotor, means for pumping gas through said slot to cause a circulation of flow around the surface of the fuselage in the vicinity of said down-wash to create an aerodynamic force acting laterally on said fuselage to counteract said torque.

8. In a helicopter having an elongated fuselage, a main sustaining rotor mounted on a vertical axis for rotation in a plane above said fuselage, a power plant driving said rotor and carried by said fuselage thereby creating a torque on said fuselage about said axis, said fuselage having one or more longitudinal slots adjacent the tail end thereof and spaced from said axis, and lying below the plane of rotation of said rotor and in the path of the down-wash from said rotor, means for pumping gas through said slot to cause a circulation of flow around the surface of the fuselage in the vicinity of said down-wash to create an aerodynamic force acting laterally on said fuselage to counteract said torque, and associate rudder means for providing lateral force when the helicopter is advancing in the relative wind.

References Cited in the file of this patent

UNITED STATES PATENTS

| | | |
|---|---|---|
| 1,909,845 | Nagler | Apr. 25, 1933 |
| 2,383,038 | Bossi | Aug. 21, 1945 |
| 2,503,172 | Pullin | Apr. 4, 1950 |